US011801659B2

(12) United States Patent
Motoyanagi et al.

(10) Patent No.: US 11,801,659 B2
(45) Date of Patent: *Oct. 31, 2023

(54) THERMALLY EXPANDABLE SHEET PRODUCTION METHOD AND SHAPED OBJECT PRODUCTION METHOD

(71) Applicant: CASIO COMPUTER CO., LTD., Tokyo (JP)

(72) Inventors: Yoshimune Motoyanagi, Hamura (JP); Yuji Horiuchi, Higashiyamato (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 797 days.

This patent is subject to a terminal disclaimer.

(21) Appl. No.: 16/721,226

(22) Filed: Dec. 19, 2019

(65) Prior Publication Data
US 2020/0122429 A1 Apr. 23, 2020

Related U.S. Application Data

(62) Division of application No. 15/883,529, filed on Jan. 30, 2018, now Pat. No. 10,543,659.

(30) Foreign Application Priority Data

Mar. 7, 2017 (JP) .................. 2017-042813

(51) Int. Cl.
B32B 5/18 (2006.01)
B32B 5/32 (2006.01)
(Continued)

(52) U.S. Cl.
CPC ................ B32B 5/18 (2013.01); B05D 3/065 (2013.01); B05D 5/04 (2013.01); B05D 7/50 (2013.01);
(Continued)

(58) Field of Classification Search
CPC .......... B05D 3/065; B05D 5/04; B05D 7/584
See application file for complete search history.

(56) References Cited

U.S. PATENT DOCUMENTS 4,902,568 A 2/1990 Morohoshi
5,554,490 A 9/1996 Imaeda
(Continued)

FOREIGN PATENT DOCUMENTS

CN 103182873 A 7/2013
CN 105415892 A 3/2016
(Continued)

OTHER PUBLICATIONS

Matsumoto Yushi-Seiyaku Co., Ltd., Product Information, Matsumoto Microsphere F and FN series [retrieved on Oct. 28, 2020]. Retrieved from the Internet <URL: https://www.mtmtys.co.jp/product/general/data01.html>.
(Continued)

Primary Examiner — Dah-Wei D. Yuan
Assistant Examiner — Kristen A Dagenais
(74) Attorney, Agent, or Firm — Scully, Scott, Murphy & Presser, P.C.

(57) ABSTRACT

A thermally expandable sheet includes:
a first thermally expansive layer that is formed on one side of a base and contains a first thermally expandable material and a first binder, the first thermally expansive layer having a first ratio of the first thermally expandable material with respect to the first binder; and
a second thermally expansive layer that is formed on the first thermally expansive layer and contains a second thermally expandable material and a second binder, the second thermally expansive layer having a second ratio of the second thermally expandable material with respect to the second binder,
wherein the second ratio is lower than the first ratio.

19 Claims, 8 Drawing Sheets

(51) Int. Cl.
  *B41M 5/50*   (2006.01)
  *B05D 5/04*   (2006.01)
  *B05D 7/00*   (2006.01)
  *B05D 3/06*   (2006.01)

(52) U.S. Cl.
  CPC ............... *B05D 7/584* (2013.01); *B32B 5/32* (2013.01); *B41M 5/502* (2013.01); *B41M 5/506* (2013.01); *B41M 5/508* (2013.01); *B32B 2250/22* (2013.01); *B32B 2305/54* (2013.01); *B32B 2451/00* (2013.01); *Y10T 428/25* (2015.01); *Y10T 428/254* (2015.01)

(56) References Cited

U.S. PATENT DOCUMENTS

| | | | |
|---|---|---|---|
| 2002/0094933 A1* | 7/2002 | Iwasaki | B41M 5/3333 503/216 |
| 2006/0194003 A1* | 8/2006 | Tsukada | B41M 5/42 428/32.1 |
| 2006/0257594 A1 | 11/2006 | Haas | |
| 2007/0202303 A1 | 8/2007 | Bischoff et al. | |
| 2016/0075083 A1 | 3/2016 | Motoyanagi | |
| 2018/0257333 A1 | 9/2018 | Motoyanagi et al. | |
| 2018/0257415 A1 | 9/2018 | Motoyanagi | |
| 2020/0122429 A1 | 4/2020 | Motoyanagi et al. | |

FOREIGN PATENT DOCUMENTS

| | | |
|---|---|---|
| JP | S64-028660 A | 1/1989 |
| JP | H03-50274 A | 3/1991 |
| JP | H09-95040 A | 4/1997 |
| JP | H09-207428 A | 8/1997 |
| JP | H10-237406 A | 9/1998 |
| JP | H11-34201 A | 2/1999 |
| JP | H11-116846 A | 4/1999 |
| JP | 2000-218723 A | 8/2000 |
| JP | 2001-150812 A | 6/2001 |
| JP | 2001-277407 A | 10/2001 |
| JP | 2002-067068 A | 3/2002 |
| JP | 2005-088559 A | 4/2005 |
| JP | 2007-095477 A | 4/2007 |
| JP | 2009-281112 A | 12/2009 |
| JP | 2009281112 A * | 12/2009 |
| JP | 5212504 B2 | 6/2013 |
| JP | 2013-539492 A | 10/2013 |
| JP | 2018-144376 A | 9/2018 |
| JP | 2018-144378 A | 9/2018 |

OTHER PUBLICATIONS

Decision of Dismissal of Amendment dated Oct. 27, 2020 received in Japanese Patent Application No. JP 2019-098491 together with an English language translation.
Office Action dated Apr. 1, 2019 received in U.S. Appl. No. 15/883,576.
Office Action dated Mar. 21, 2019 received in U.S. Appl. No. 15/883,636.
Office Action dated Aug. 15, 2019 received in U.S. Appl. No. 15/883,576.
Notification of Reasons for Refusal dated Jan. 29, 2019 received in Japanese Patent Application No. JP 2017-042813 together with an English language translation.
Notification of Reasons for Refusal dated Jan. 15, 2019 received in Japanese Patent Application No. JP 2017-042815 together with an English language translation.
Notification of Reasons for Refusal dated Jan. 8, 2019 received in Japanese Patent Application No. JP 2017-042814 together with an English language translation.
Office Action dated Mar. 21, 2019 received in U.S. Appl. No. 15/883,529.
Office Action dated Jul. 9, 2019 received in U.S. Appl. No. 15/883,529.
Notice of Allowance dated Sep. 16, 2019 received in U.S. Appl. No. 15/883,636.
Office Action dated Jul. 9, 2019 received in U.S. Appl. No. 15/883,636.
Notice of Reasons for Refusal dated Apr. 14, 2020 in Japanese Patent Application No. 2019-098491.
First Office Action dated Feb. 23, 2022 received in Chinese Patent Application No. CN 202010900951.X together with an English language translation.
First Office Action dated Mar. 29, 2021 received in Chinese Patent Application No. CN 202010091948.8 together with an English language translation.
Notice of Reasons for Refusal dated Jul. 7, 2020 received in Japanese Patent Application No. JP 2019-098491 together with an English language translation.
Office Action dated Sep. 8, 2022 received in U.S. Appl. No. 16/713,739.

* cited by examiner

FIRST THERMALLY EXPANSIVE LAYER ONLY

THERMALLY EXPANDABLE SHEET OF THIS EMBODIMENT

THERMALLY EXPANDABLE SHEET PRODUCTION METHOD AND SHAPED OBJECT PRODUCTION METHOD

CROSS-REFERENCE TO RELATED APPLICATION

This application is a divisional of U.S. application Ser. No. 15/883,529, filed Jan. 30, 2018, which claims the benefit of Japanese Patent Application No. 2017-042813, filed on Mar. 7, 2017, the entire disclosure of which is incorporated by reference herein.

FIELD

This application relates generally to a thermally expandable sheet foaming and expanding according to the amount of heat absorbed and a method of producing the thermally expandable sheet.

BACKGROUND

In the prior art, thermally expandable sheets in which a thermally expansive layer containing a thermally expandable material foaming and expanding according to the amount of heat absorbed is formed on one side of a base sheet are known. The thermally expansive layer can be distended in part or in whole by forming a photothermal conversion layer converting light to heat on the thermally expandable sheet and irradiating the photothermal conversion layer with light. Moreover, methods of forming a shaped object having a stereoscopically uneven surface on the thermally expandable sheet by changing the shape of the photothermal conversion layer are also known (for example, see Patent Literature Unexamined Japanese Patent Application Kokai Publication Nos. S64-28660 and 2001-150812).

In some thermally expandable sheets, the thermally expandable material (for example, thermally expandable microcapsules) aggregates on the surface while the thermally expansive layer foams. This particularly notably occurs when the content of the thermally expandable material is increased. As the thermally expandable material aggregates, the thermally expansive layer has an uneven surface. Consequently, problems are that the surface becomes rough, the sheet surface is deteriorated in smoothness, and the sheet surface easily peels off when rubbed.

Therefore, there is a demand for a thermally expandable sheet comprising a surface excellent in smoothness and rub resistance even after the thermally expansive layer is distended.

The present disclosure is made with the view of the above situation and an objective of the disclosure is to provide a thermally expandable sheet comprising a surface excellent in smoothness and rub resistance even after the thermally expansive layer is distended and a method of producing the thermally expandable sheet.

SUMMARY

A thermally expandable sheet includes:
a first thermally expansive layer that is formed on one side of a base and contains a first thermally expandable material and a first binder, the first thermally expansive layer having a first ratio of the first thermally expandable material with respect to the first binder; and
a second thermally expansive layer that is formed on the first thermally expansive layer and contains a second thermally expandable material and a second binder, the second thermally expansive layer having a second ratio of the second thermally expandable material with respect to the second binder,
wherein the second ratio is lower than the first ratio.

A thermally expandable sheet production method includes:
a first formation step of forming on one side of a base a first thermally expansive layer that contains a first thermally expandable material and a first binder, the first thermally expansive layer having a first ratio of the first thermally expandable material with respect to the first binder; and
a second formation step of forming on the first thermally expansive layer a second thermally expansive layer that contains a second thermally expandable material and a second binder, the second thermally expansive layer having a second ratio of the second thermally expandable material with respect to the second binder,
wherein in the second formation step, the second thermally expansive layer is formed on the first thermally expansive layer with the second ratio lower than the first ratio.

A thermally expandable sheet includes:
a first thermally expansive layer that is formed on one side of a base and in which a first thermally expandable material is dispersed in a first binder at a first ratio; and
a second thermally expansive layer that is formed on the first thermally expansive layer and in which a second thermally expandable material is dispersed in a second binder at a second ratio,
wherein the second ratio is lower than the first ratio.

BRIEF DESCRIPTION OF THE DRAWINGS

A more complete understanding of this application can be obtained when the following detailed description is considered in conjunction with the following drawings, in which.

DETAILED DESCRIPTION

The thermally expandable sheet and the method of producing the thermally expandable sheet according to an embodiment of the present disclosure will be described in detail below using the drawings.

Here, in this embodiment, a "stereoscopic image" means a shaped object and the shaped object includes a wide range of shapes such as simple shapes, geometrical shapes, and characters. Furthermore, the shaped object includes decoration formed as a result of decorating. The decoration means something reminiscent of a sense of beauty visually and/or tactually. Moreover, "stereoscopic image formation" includes not only forming a shaped object but also decorating (ornamenting).

Embodiment 1

Figure 1:
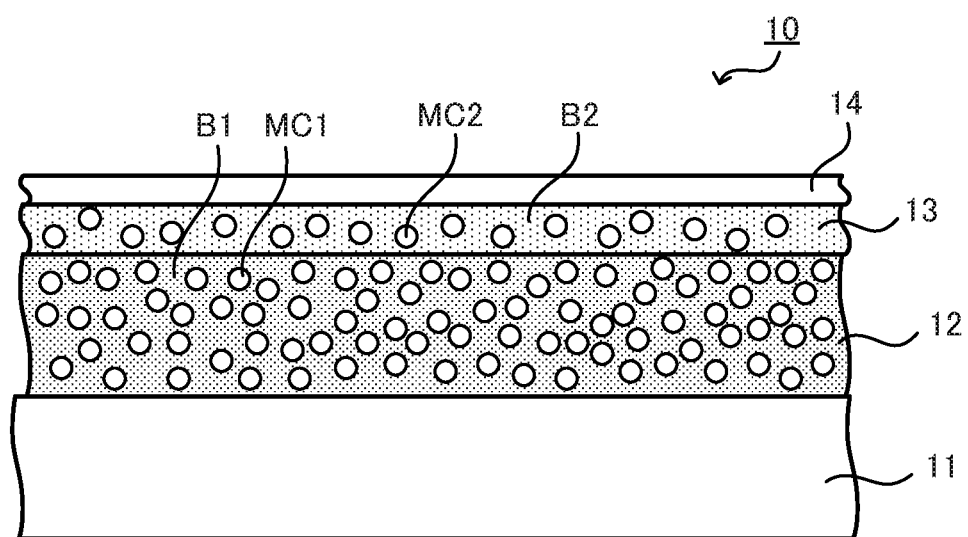
FIG. 1 is a cross-sectional view schematically showing the thermally expandable sheet according to Embodiment 1.

A thermally expandable sheet 10 according to Embodiment 1 comprises, as shown in FIG. 1, a base 11, a first thermally expansive layer 12, a second thermally expansive layer 13, and an ink reception layer 14. The first thermally expansive layer 12 and the second thermally expansive layer 13 constitute the thermally expansive layer of the thermally expandable sheet 10. Moreover, as described in detail later, the thermally expandable sheet 10 undergoes printing by a stereoscopic image formation system 50 outlined in FIGS. 3A to 3C and has a shaped object (a stereoscopic image) formed.

The base 11 is a sheet-like member supporting the thermally expansive layer. As the base 11, paper such as high-quality paper, medium-quality paper, and synthetic paper, or a conventionally used plastic film such as polypropylene, polyethylene terephthalate (PET), and polybutylene terephthalate (PBT) can be used. Moreover, the base 11 does not rise on the opposite side of the base 11 (the underside shown in FIG. 1) and furthermore has a strength to the extent of not wrinkling or largely undulating when the first thermally expansive layer 12 and the second thermally expansive layer 13 foam and distend in whole or in part. Additionally, the base 11 has enough heat-resistance to resist heating for foaming the thermally expansive layer. The thickness of the base 11 is, for example, 200 μm or so.

The first thermally expansive layer 12 is formed on one side (the top surface shown in FIG. 1) of the base 11. The first thermally expansive layer 12 is a layer distensible to the dimension according to the heating temperature and the heating time and comprises multiple thermally expandable materials MC1 (thermally expandable microcapsules or micro powder) dispersed in a binder B1. Moreover, as described in detail later, in this embodiment, a photothermal conversion layer is formed on the ink reception layer 14 provided on the top surface (the front side) of the base 11 and/or on the underside (the back side) of the base 11 and is irradiated with light (electromagnetic waves) to cause the regions where the photothermal conversion layer is provided to generate heat. Absorbing the heat generated in the photothermal conversion layer on the front side and/or on the back side, the first thermally expansive layer 12 foams and distends, whereby it is possible to selectively distend only particular regions. Moreover, the thickness of the first thermally expansive layer 12 is, for example, 100 μm or so.

As the binder B1, a thermoplastic resin selected from vinyl acetate-based polymers, acrylic polymers, and the like is used. Moreover, the thermally expandable microcapsules MC1 comprise propane, butane, or other low-boiling vaporizing substances sealed in a thermoplastic resin shell. The shell is formed by, for example, a thermoplastic resin selected from polystyrene, polyvinyl chloride, polyvinyliden chloride, polyvinyl acetate, polyacrylic acid ester, polyacrylonitrile, polybutadiene, or copolymers thereof. The average particle size of the thermally expandable microcapsules is approximately 5 to 50 m. As the microcapsules are heated to the thermal expansion start temperature or above, their polymer resin shell softens, the encapsulated low-boiling vaporizing substances vaporize, and the pressure causes the capsules to distend. Although depending on the characteristics of the microcapsules used, the microcapsules distend five or so times the pre-distended particle size. Here, in FIG. 1, the microcapsules MC1 are shown in nearly the same particle size for convenience. In practice, the particle size of the microcapsules MC1 varies and not all microcapsules have the same particle size.

The second thermally expansive layer 13 is formed on the first thermally expansive layer 12 formed on one side of the base 11. Like the first thermally expansive layer 12, the second thermally expansive layer 13 is also a layer distensible to the dimension according to the heating temperature and the heating time and comprises a thermally expandable material MC2 (thermally expandable microcapsules) dispersed in a binder B2. The same materials as the binder B1 and the thermally expandable microcapsules MC1 of the first thermally expansive layer 12 are used for the binder B2 and the thermally expandable microcapsules MC2, respectively. Use of the same materials for the first thermally expansive layer 12 and the second thermally expansive layer 13 preferably allows the raw materials to share, simplifies the production process, and additionally, contributes to reduction in production cost. Moreover, like the first thermally expansive layer 12, absorbing the heat generated in the photothermal conversion layer formed on the top surface and/or on the underside of the thermally expandable sheet 10, the second thermally expansive layer 13 foams and distends.

In this embodiment, the ratio at which the thermally expandable material MC2 is contained in the binder B2 (also termed the content ratio) in the second thermally expansive layer 13 is lower than the ratio at which the thermally expandable material MC1 is contained in the binder B1 (also termed the content ratio) in the first thermally expansive layer 12. Here, the ratio at which the thermally expandable material is contained in the binder is defined by volume ratio, weight ratio, or the like. For example, in the case of using the weight ratio, the weight ratio of the thermally expandable material MC2 to the binder B2 (the second ratio) is lower than the weight ratio of the thermally expandable material MC1 to the binder B1 (the first ratio) and specifically, is 1/3 to 1/8 or so. In other words, for example, assuming that the thermally expandable material MC2 dispersed in 100 parts by weight of the binder B2 is X2 parts by weight and the thermally expandable material MC1 dispersed in 100 parts by weight of the binder B1 is X1 parts by weight, X2/X1 is less than 1 and 1/3 to 1/8 or so. Here, the ratio at which the thermally expandable material is contained in the binder may be defined by density. In such a case, it can be said that the second thermally expansive layer 13 contains the thermally expandable material at a density lower than the first thermally expansive layer 12.

Moreover, since the second thermally expansive layer 13 contains the thermally expandable material at a ratio lower than the first thermally expansive layer 12, the height of the second thermally expansive layer 13 after distension is smaller than the first thermally expansive layer 12 when they are distended under the same condition. Therefore, it is preferable that the second thermally expansive layer 13 is formed thinner than the first thermally expansive layer 12. Additionally, it is preferable that the second thermally expansive layer 13 is formed not thicker than necessary. From these viewpoints, it is preferable that the thickness of the second thermally expansive layer 13 is a thickness corresponding to several, for example one to ten, preferably one to five, of the thermally expandable material MC2. In other words, it is preferable that the second thermally expansive layer 13 is formed to a thickness one to ten times, preferably one to five times, the average particle size of the microcapsules. For example, the second thermally expansive layer 13 is formed to a thickness of 50 m or so. Moreover, it is preferable that the thickness of the second thermally expansive layer 13 is 2/3 to 1/10 or so of the thickness of the first thermally expansive layer 12.

The ink reception layer 14 is formed on the second thermally expansive layer 13 formed on one side of the base 11. The ink reception layer 14 is a layer receiving and fixing ink used in the printing step, for example ink of an inkjet printer. The ink reception layer 14 is formed using a general-purpose material according to the ink used in the printing step. For example, in the case of using water-based ink, the ink reception layer 14 is formed using a material selected from porous silica, polyvinyl alcohol (PVA), and the like. The thickness of the ink reception layer 14 is, for example, 10 m or so. Here, in the case of using ultraviolet-curable ink in an inkjet system or the like, the ink reception layer 14 can be omitted. Moreover, when a material that is poor in receiving ink such as plastic film is used for the base 11 and furthermore the photothermal conversion layer is formed on the back side of the base 11, it is preferable to provide an ink reception layer also on the underside (the back side) of the base 11.

As described in detail later, the thermally expandable sheet 10 of this embodiment comprises the second thermally expansive layer 13 containing the thermally distensible material at a ratio lower than the first thermally expansive layer 12, whereby it is possible to make the sheet surface excellently smooth and impart excellent rub resistance.

(Method of Producing the Thermally Expandable Sheet)

Figure 2A:
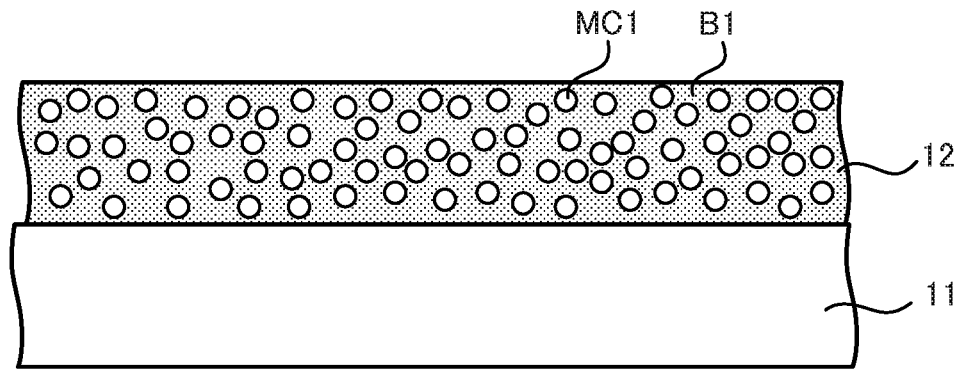
FIGS. 2A to 2C are cross-sectional views schematically showing the method of producing the thermally expandable sheet according to Embodiment 1.
Figure 2B:
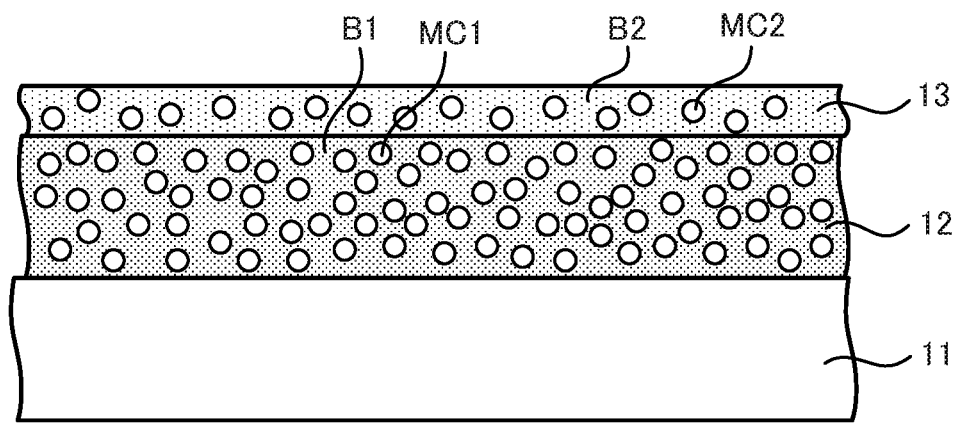
Figure 2C:
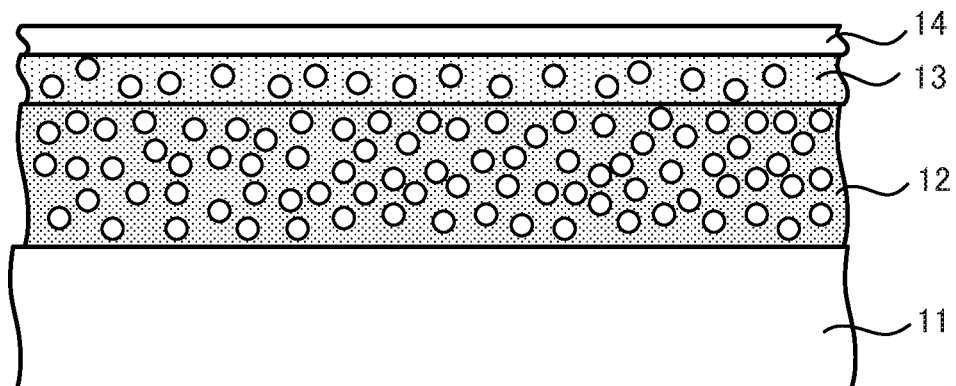

The method of producing the thermally expandable sheet 10 will be described next using FIGS. 2A to 2C.

First, a sheet-like material, for example paper, is prepared as the base 11. The base 11 can be in the form of a roll, or precut.

Next, a binder comprising a thermoplastic resin or the like and a thermally expandable material (thermally expandable microcapsules) are mixed to prepare a coating liquid for forming the first thermally expansive layer 12.

Subsequently, the coating liquid is applied on the base 11 using a known coating device such as a bar coater, a roll coater, or a spray coater. Subsequently, the coating is dried to form the first thermally expansive layer 12 as shown in FIG. 2A. Here, in order to obtain a target thickness of the first thermally expansive layer 12, it is possible to apply and dry the coating liquid multiple times.

Next, a binder and a thermally expandable material are mixed to prepare a coating liquid for forming the second thermally expansive layer 13. The same materials as the coating liquid for forming the first thermally expansive layer 12 are used for the binder and the thermally expandable material. At this point, the content ratio of the thermally expandable material in the binder is lower than the content ratio of the thermally expandable material in the binder of the first thermally expansive layer 12 and is, for example, 1/3 to 1/8 or so in weight ratio.

Subsequently, the coating liquid for forming the second thermally expansive layer 13 is applied on the first thermally expansive layer 12 using a known coating device of a system such as a bar coater, a roll coater, or a spray coater. Then, the coating is dried to form the second thermally expansive layer 13 as shown in FIG. 2B. Here, in order to obtain a target thickness of the second thermally expansive layer 13, it is possible to apply and dry the coating liquid multiple times. Moreover, the second thermally expansive layer 13 is formed thinner than the first thermally expansive layer 12. It is preferable that the thickness of the second thermally expansive layer 13 is a thickness corresponding to several, for example 1 to 10, preferably 1 to five, of the thermally expandable material MC2.

Next, a material constituting the ink reception layer 14, for example a material selected from porous silica, PVA, and the like, is dispersed in a solvent to prepare a coating liquid for forming the ink reception layer 14. Subsequently, the coating liquid is applied on the second thermally expansive layer 13 using a known coating device of a system such as a bar coater, a roll coater, or a spray coater. Subsequently, the coating is dried to form the ink reception layer 14 as shown in FIG. 2C. Moreover, when the base 11 in the form of a roll is used, the resultant structure is cut into a size suitable for the stereoscopic image formation system (shaping system) 50.

The thermally expandable sheet 10 is produced in the above process.

(Stereoscopic Image Formation System)

Figure 3A:
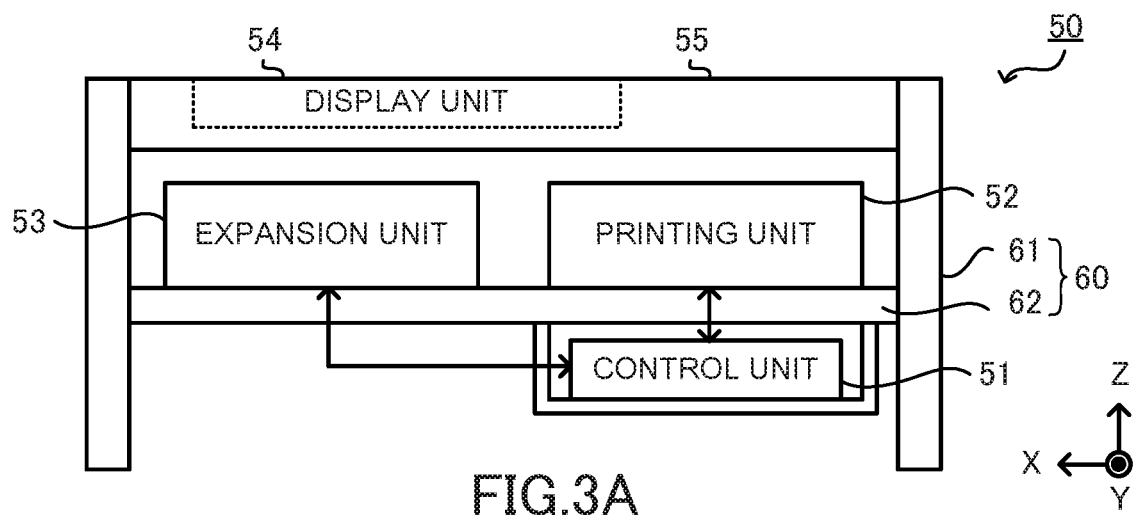
FIGS. 3A to 3C are illustrations showing the outline of the stereoscopic image formation system according to Embodiment 1.
Figure 3B:
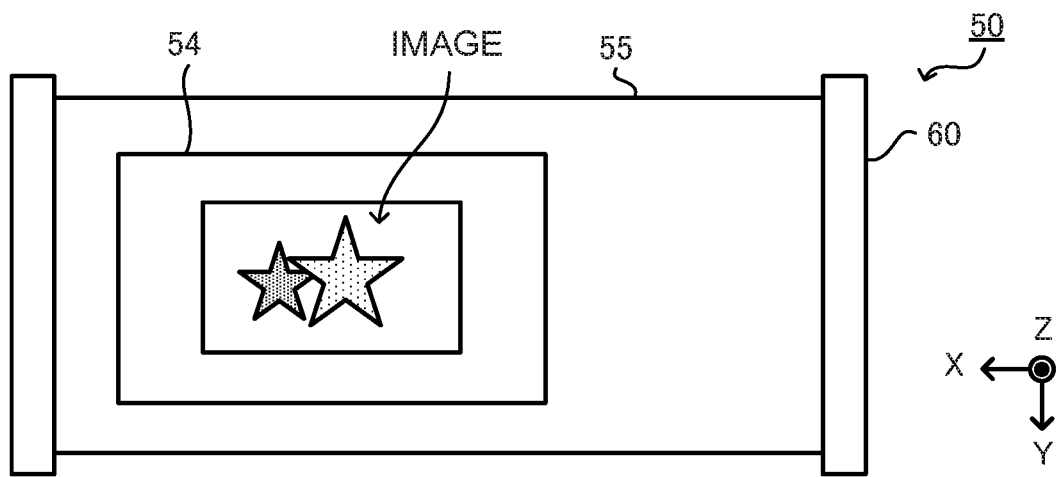
Figure 3C:
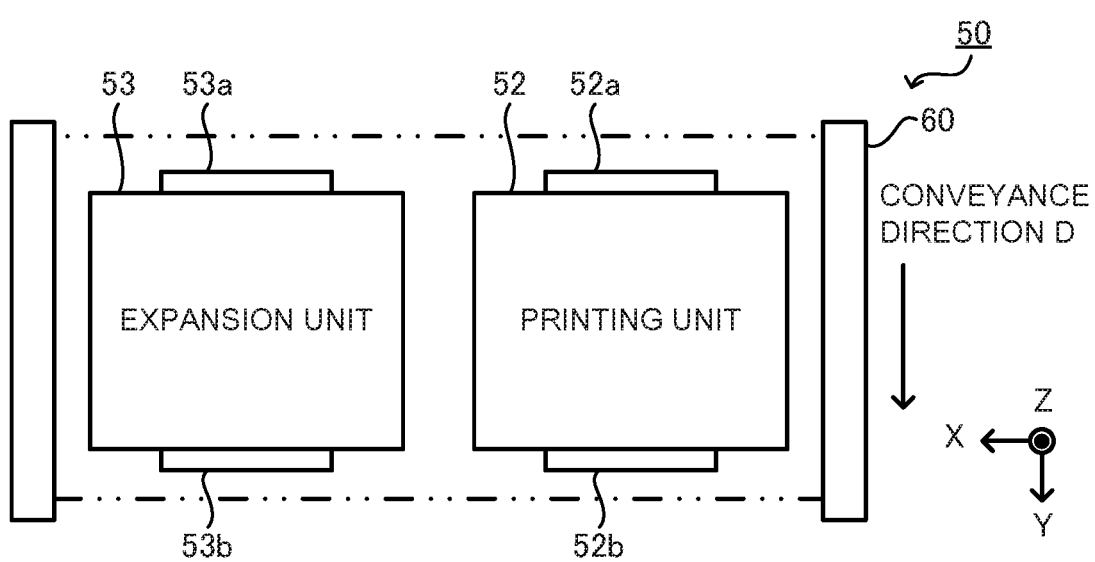

The stereoscopic image formation system 50 forming a stereoscopic image on the thermally expandable sheet 10 of this embodiment will be described next. As shown in FIGS. 3A to 3C, the stereoscopic image formation system 50 comprises a control unit 51, a printing unit 52, an expansion unit 53, a display unit 54, a top plate 55, and a frame 60. FIG. 3A is a front view of the stereoscopic image formation system 50. FIG. 3B is a plane view of the stereoscopic image formation system 50 with the top plate 55 closed. FIG. 3C is a plane view of the stereoscopic image formation system 50 with the top plate 55 opened. In FIGS. 3A to 3C, the direction X coincides with the horizontal direction, the direction Y coincides with the conveyance direction D in which the sheet is conveyed, and the direction Z coincides with the vertical direction. The directions X, Y, and Z are orthogonal to each other.

The control unit 51, the printing unit 52, and the expansion unit 53 are each placed within the frame 60 as shown in FIG. 3A. Specifically, the frame 60 comprises a pair of nearly rectangular sideboards 61 and a coupling beam 62 provided between the sideboards 61. The top plate 55 extends between the sideboards 61 in the upper part. Moreover, the printing unit 52 and the expansion unit 53 are juxtaposed in the direction X on the coupling beam 62 extending between the sideboards 61. The control unit 51 is fixed underneath the coupling beam 62. The display unit 54 is embedded in the top plate 55 to be flush with the top surface of the top plate 55.

The control unit 51 comprises a central processing unit (CPU), a read only memory (ROM), a random access memory (RAM), and the like and controls the printing unit 52, the expansion unit 53, and the display unit 54.

The printing unit 52 is a printing device of an inkjet system. As shown in FIG. 3C, the printing unit 52 comprises an introducer 52a for introducing the thermally expandable sheet 10 and a discharger 52b for discharging the thermally expandable sheet 10. The printing unit 52 prints a specified image on the front side or the back side of the thermally expandable sheet 10 introduced from the introducer 52a and discharges the thermally expandable sheet 10 on which the image is printed from the discharger 52b. Moreover, the printing unit 52 comprises color inks (cyan (C), magenta (M), and yellow (Y)) for forming a color ink layer 42 described later and black ink (containing carbon black) for forming a front side photothermal conversion layer 41 and a back side photothermal conversion layer 43. Here, for forming black or gray color in the color ink layer 42, carbon black-free black color ink may further be provided as a color ink.

The printing unit 52 acquires from the control unit color image data presenting a color image (the color ink layer 42) to print on the front side of the thermally expandable sheet 10 and prints the color image (the color ink layer 42) using the color inks (cyan, magenta, and yellow) based on the color image data. Black or gray color in the color ink layer 42 is formed by mixing the three, CMY, colors or using carbon black-free black color ink.

Moreover, the printing unit 52 prints the front side photothermal conversion layer 41 using black ink based on front side foaming data that are data presenting parts to foam and distend on the front side of the thermally expandable sheet 10. Similarly, the printing unit 52 prints the back side photothermal conversion layer 43 using black ink based on back side foaming data that are data presenting parts to foam and distend on the back side of the thermally expandable sheet 10. Moreover, carbon black-containing black ink is an example of the material converting electromagnetic waves to heat (for example, an electromagnetic-heat conversion material such as carbon), namely the material converting light to heat. The thermally expansive layer distends higher in parts where the black ink density is higher. Therefore, the gradation of the black ink density is determined corresponding to the target heights.

The expansion unit 53 is an expansion device heating and distending the thermally expandable sheet 10. As shown in FIG. 3C, the expansion unit 53 comprises an introducer 53a for introducing the thermally expandable sheet 10 and a discharger 53b for discharging the thermally expandable sheet 10. The expansion unit 53 heats and distends the thermally expandable sheet 10 introduced from the introducer 53a and discharges the distended, thermally expandable sheet 10 from the discharger 53b. The expansion unit 53 comprises an irradiator (not shown) therein. The irradiator is, for example, a halogen lamp and irradiates the thermally expandable sheet 10 with light in the near infrared range (wavelengths 750 to 1400 nm), the visible light range (wavelengths 380 to 750 nm), or the mid-infrared range (wavelengths 1400 to 4000 nm). As the thermally expandable sheet 10 on which carbon black-containing black ink is printed is irradiated with light, the light is converted to heat more efficiently in the parts where the black ink is printed than in the parts where no black ink is printed. Therefore, the thermally expansive layer (the first thermally expansive layer and the second thermally expansive layer) is mainly heated in the regions where the black ink is printed and consequently, the thermally expansive layer distends in the regions where the black ink is printed.

The display unit 54 comprises a touch panel and the like. The display unit 54 displays, for example as shown in FIG. 3B, an image (stars shown in FIG. 3B) to be printed on the thermally expandable sheet 10 by the printing unit 52. Moreover, the display unit 54 displays operation guidance and the like so that the user can operate the stereoscopic image formation system 50 by touching the display unit 54.

(Stereoscopic Image Formation Process)

The process flow of forming a stereoscopic image on the thermally expandable sheet 10 by the stereoscopic image formation system 50 will be described next with reference to the flowchart shown in FIG. 4 and the cross-sectional views of the thermally expandable sheet 10 shown in FIGS. 5A to 5E.

Figure 5A:
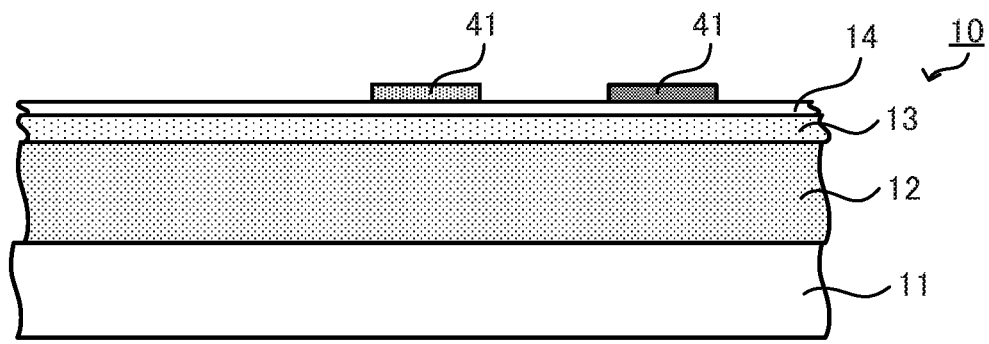
FIGS. 5A to 5E are cross-sectional views schematically showing the stereoscopic image formation process according to Embodiment 1.

First, the user prepares a thermally expandable sheet 10 before a stereoscopic image is formed, and specifies color image data, front side foaming data, and back side foaming data via the display unit 54. Then, the thermally expandable sheet 10 is inserted into the printing unit 52 with the front side facing up. The printing unit 52 prints a photothermal conversion layer (the front side photothermal conversion layer 41) on the front side of the inserted thermally expandable sheet 10 (Step S1). The front side photothermal conversion layer 41 is a layer formed by a material converting light to heat, specifically carbon black-containing black ink. The printing unit 52 ejects carbon black-containing black ink on the front side of the thermally expandable sheet 10 according to the specified front side foaming data. Consequently, as shown in FIG. 5A, the front side photothermal conversion layer 41 is formed on the ink reception layer 14. Here, for easier understanding, the front side photothermal conversion layer 41 is shown as if it is formed on the ink reception layer 14; however, more precisely, the black ink is received in the ink reception layer 14 and therefore, the photothermal conversion layer is formed in the ink reception layer 14.

Figure 5B:
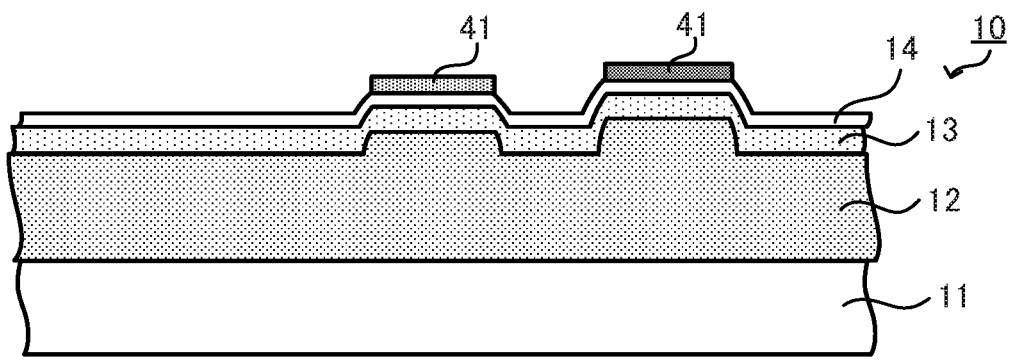

Secondly, the user inserts the thermally expandable sheet 10 on which the photothermal conversion layer 41 is printed into the expansion unit 53 with the front side facing up. The expansion unit 53 heats the inserted thermally expandable sheet 10 from the front side. Specifically, the expansion unit 53 irradiates the front side of the thermally expandable sheet 10 by the irradiator (Step S2). The front side photothermal conversion layer 41 printed on the front side of the thermally expandable sheet 10 absorbs the irradiated light and generates heat. Consequently, as shown in FIG. 5B, the regions of the thermally expandable sheet 10 where the photothermal conversion layer 41 is printed rise and distend. Moreover, in FIG. 5B, if the black ink density is higher in the photothermal conversion layer 41 on the right than in the photothermal conversion layer 41 on the left, as shown in the figure, it is possible to distend the region where the print is denser higher.

Figure 5C:
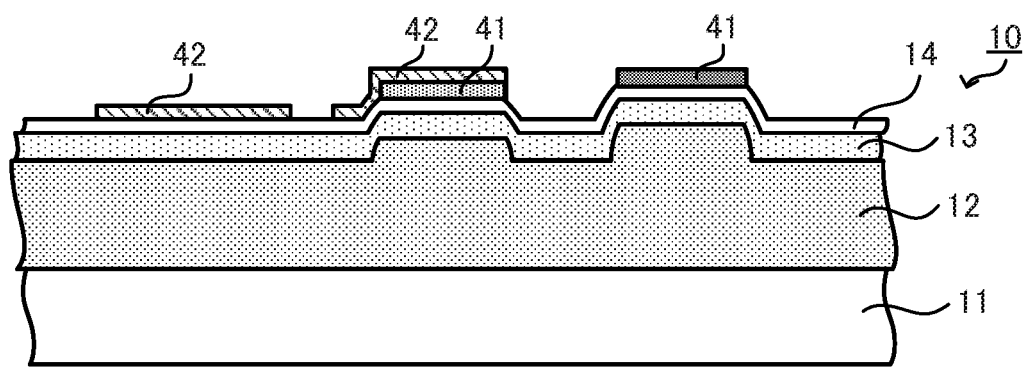

Thirdly, the user inserts the thermally expandable sheet 10 of which the front side is heated and distended into the printing unit 52 with the front side facing up. The printing unit 52 prints a color image (the color ink layer 42) on the front side of the inserted thermally expandable sheet 10 (Step S3). Specifically, the printing unit 52 ejects cyan C, magenta M, and yellow Y inks on the front side of the thermally expandable sheet 10 according to the specified color image data. Consequently, as shown in FIG. 5C, the color ink layer 42 is formed on the ink reception layer 14 and the photothermal conversion layer 41.

Fourthly, the user inserts the thermally expandable sheet 10 on which the color ink layer 42 is printed into the expansion unit 53 with the back side facing up. The expansion unit 53 heats the inserted thermally expandable sheet 10 from the back side and dries the color ink layer 42 formed on the front side of the thermally expandable sheet 10 (Step S4). Specifically, the expansion unit 53 emits light to the back side of the thermally expandable sheet 10 by the irradiator to heat the color ink layer 42 and evaporate the solvent contained in the color ink layer 42.

Figure 5D:
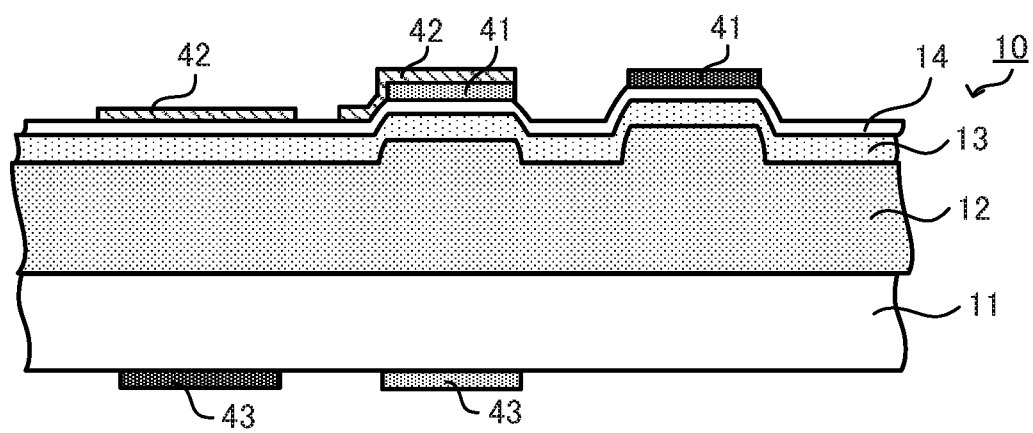

Fifthly, the user inserts the thermally expandable sheet 10 on which the color ink layer 42 is printed into the printing unit 52 with the back side facing up. The printing unit 52 prints a photothermal conversion layer (the back side photothermal conversion layer 43) on the back side of the inserted thermally expandable sheet 10 (Step S5). Like the front side photothermal conversion layer 41 printed on the front side of the thermally expandable sheet 10, the back side photothermal conversion layer 43 is a layer formed by a material converting light to heat, specifically carbon black-containing black ink. The printing unit 52 ejects carbon black-containing black ink on the back side of the thermally expandable sheet 10 according to the specified back side foaming data. Consequently, as shown in FIG. 5D, the photothermal conversion layer 43 is formed on the back side of the base 11. Also with the back side photothermal conversion layer 43, if the black ink density is higher in the photothermal conversion layer 43 on the left than in the photothermal conversion layer 43 on the right, the region where the print is denser is more distensible as shown in the figure.

Figure 5E:
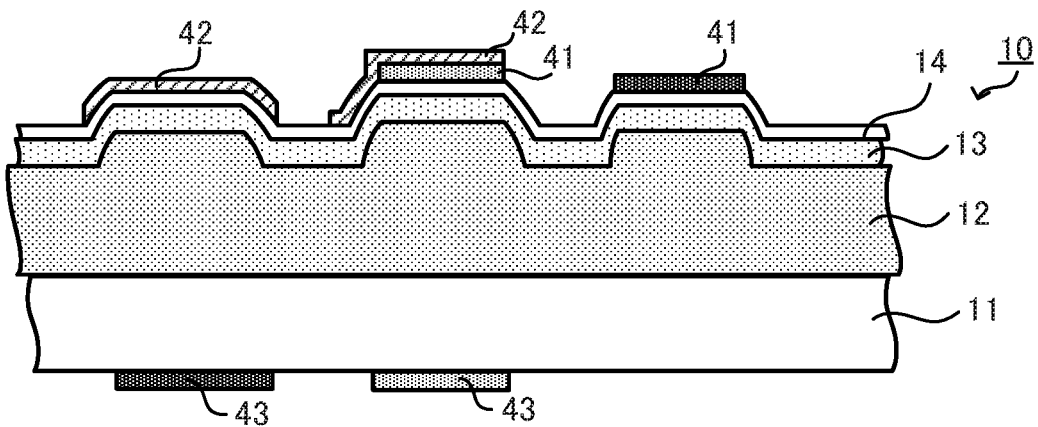

Sixthly, the user inserts the thermally expandable sheet 10 on which the back side photothermal conversion layer 43 is printed into the expansion unit 53 with the back side facing up. The expansion unit 53 heats the inserted thermally expandable sheet 10 from the back side. Specifically, the expansion unit 53 irradiates the back side of the thermally expandable sheet 10 by the irradiator (not shown) (Step S6). The photothermal conversion layer 43 printed on the back side of the thermally expandable sheet 10 absorbs the irradiated light and generates heat. Consequently, as shown in FIG. 5E, the regions of the thermally expandable sheet 10 where the photothermal conversion layer 43 is printed rise and distend.

A stereoscopic image (a stereoscopic object or a shaped object) is formed on the thermally expandable sheet 10 in the above process.

According to the thermally expandable sheet and the thermally expandable sheet production method of this embodiment, the second thermally expansive layer containing a thermally expandable material at a content ratio lower than the first thermally expansive layer is formed on the first thermally expansive layer, whereby it is possible to reduce occurrence of unevenness on the surface, make the thermally expandable sheet surface excellently smooth, and thus impart excellent rub resistance.

Figure 6A:
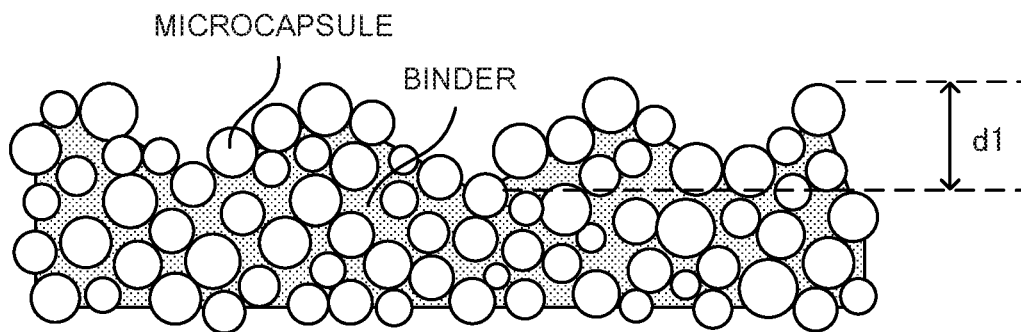
FIGS. 6A and 6B are illustrations showing comparison between a comparative example and the thermally expansive layer of this embodiment.
Figure 6B:
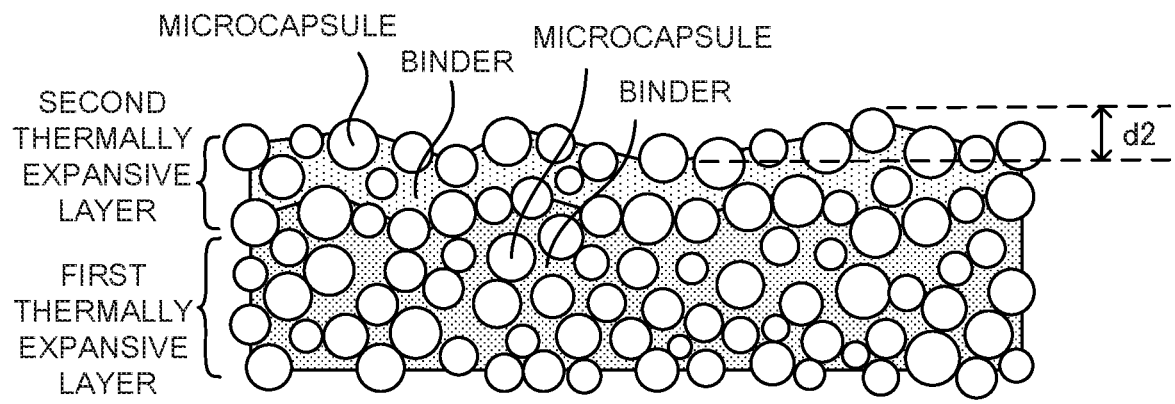

For example, as a comparative example, FIG. 6A schematically shows a structure of a distended thermally expandable sheet comprising only the first thermally expansive layer, in other words not comprising the second thermally expansive layer. In this structure, as shown in FIG. 6A, microcapsules aggregate on the surface of the thermally expansive layer and cause unevenness of a level difference d1 on the surface. As shown in the figure, the microcapsules situated on the surface of the thermally expansive layer easily come off and are poor in rub resistance. Conversely, in the thermally expandable sheet shown in FIG. 6B that adopts the same structure as this embodiment, the level difference d2 that occurs on the surface of the second thermally expansive layer is smaller than the level difference d1. Since there is no strong layer such as the base immediately below, the second thermally expansive layer distends not only upward but also downward. As a result, unevenness that occurs in the first thermally expansive layer is filled due to distension of the second thermally expansive layer. Moreover, the first thermally expansive layer is suppressed by the second thermally expansive layer while distending and occurrence of unevenness on the surface of the first thermally expansive layer is suppressed. Furthermore, the second thermally expansive layer contains a smaller amount of microcapsules; therefore it is possible to suppress aggregation of microcapsules on the surface of the second thermally expansive layer. Hence, compared with the structure not comprising the second thermally expansive layer, the thermally expandable sheet of this embodiment suppresses occurrence of unevenness on the surface of the thermally expansive layer by the second thermally expansive layer, whereby it is possible to improve the smoothness of the sheet surface. Moreover, it is also possible to improve the rub resistance of the thermally expansive layer.

Additionally, particularly the second thermally expansive layer of this embodiment contains a thermally expandable material and thus the second thermally expansive layer itself distends. Therefore, the second thermally expansive layer also has an effect of contributing to increase in height of the entire thermally expansive layer. Moreover, the ink reception layer is a layer to receive and fix ink on the surface of the thermally expandable sheet. With this layer provided on the second thermally expansive layer, the surface of the thermally expandable sheet is made more excellently smooth and more excellent in rub resistance.

Embodiment 2

The thermally expandable sheet according to Embodiment 2 will be described using the drawings. A thermally expandable sheet 20 according to Embodiment 2 is different from the thermally expandable sheet 10 according to Embodiment 1 in that the second thermally expansive layer 13 contains white pigment. The parts having the same structure as in Embodiment 1 are referred to by the same reference numbers and their explanation will be omitted.

Figure 7:
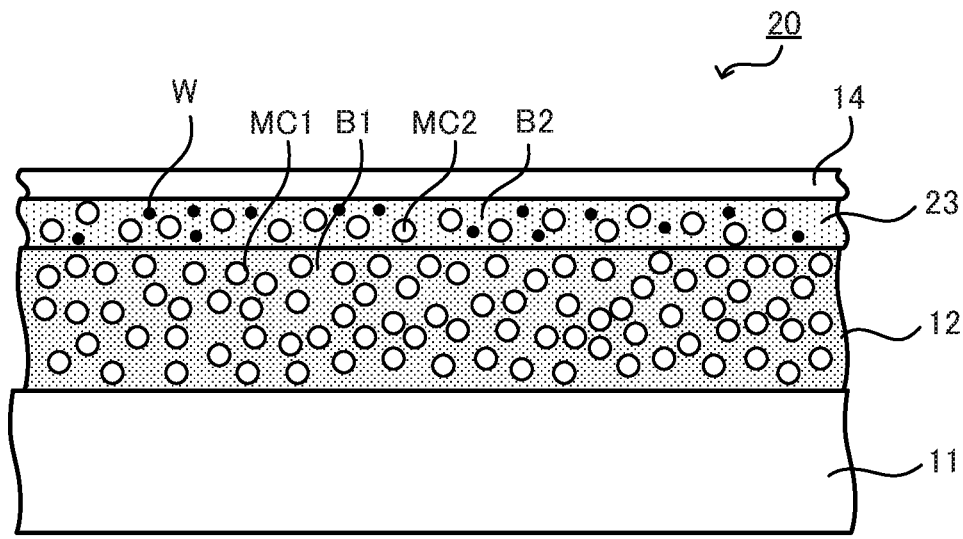
FIG. 7 is a cross-sectional view schematically showing the thermally expandable sheet according to Embodiment 2.

The thermally expandable sheet 20 according to Embodiment 2 comprises, as shown in FIG. 7, the base 11, the first thermally expansive layer 12, a second thermally expansive layer 23, and the ink reception layer 14.

The second thermally expansive layer 23 is formed on the first thermally expansive layer 12 formed on one side of the base 11. The second thermally expansive layer 23 comprises the thermally expandable material MC2 (thermally expandable microcapsules) in the binder B2 as in Embodiment 1 and characteristically, further contains white pigment W. As the white pigment W, a material selected from titanium oxide, barium sulfate, zinc oxide, and the like can be used and particularly, titanium oxide is preferable. Here, the content ratio of the thermally expandable material MC2 in the binder B2 is set lower than the content ratio of the thermally expandable material MC1 in the binder B1 of the first thermally expansive layer 12 as in Embodiment 1.

Moreover, using a white material such as porous silica as the ink reception layer 14, the degree of whiteness of the ink reception layer 14 is also improved. Thus, preferably, the degree of whiteness of the thermally expandable sheet 20 is improved also by the ink reception layer 14.

With the second thermally expansive layer 23 further containing white pigment, the thermally expandable sheet 20 of this embodiment can make the appearance of the thermally expandable sheet 20 whiter and show the color of the color ink layer provided on the thermally expandable sheet 20 better.

The method of producing the thermally expandable sheet 20 of this embodiment will be described next.

The steps up to forming the base 11 and the first thermally expansive layer 12 on the base 11 are the same as in Embodiment 1.

Next, a thermally expandable material and white pigment are dispersed in a binder using a known dispersion device or the like to prepare a coating liquid for forming the second thermally expansive layer 23. At this point, the weight of the thermally expandable material with respect to the binder in the coating liquid is lower than the weight of the thermally expandable material with respect to the binder in the coating liquid for forming the first thermally expansive layer 12 and specifically, is 1/3 to 1/8 or so. Subsequently, the coating liquid is applied on the base using a known coating device of a system such as a bar coater, a roll coater, and a spray coater to form a coating. Subsequently, the coating is dried. In order to form the second thermally expansive layer 23 of a target thickness, the coating liquid may be applied and dried in multiple parts.

Subsequently, as in Embodiment 1, the ink reception layer 14 is formed on the second thermally expansive layer 23 and the resultant structure is cut as needed.

As a result, the thermally expandable sheet 20 according to Embodiment 2 is produced.

With the second thermally expansive layer 23 further containing white pigment, the thermally expandable sheet 20 of this embodiment can improve the degree of whiteness of the thermally expansive layer, whereby it is possible to add an excellent effect of showing the color of the color ink layer provided on the thermally expandable sheet 20 better. Furthermore, if the ink reception layer 14 is formed using a white material such as porous silica, preferably, the degree of whiteness of the thermally expandable sheet 20 is improved also by the ink reception layer 14. Additionally, in this embodiment, the white pigment W is contained in the second thermally expansive layer 23, not in the first thermally expansive layer 12 or the ink reception layer 14. Therefore, there is no need of mixing the white pigment W with the first thermally expansive layer 12, whereby an excellent effect of preventing the first thermally expansive layer 12 from reducing the distensible height and furthermore preventing the ink reception layer 14 from deteriorating in the ability of receiving ink are obtained.

Embodiment 3

A thermally expandable sheet 30 according to Embodiment 3 will be described using the drawings. The thermally expandable sheet 30 according to Embodiment 3 is different from the thermally expandable sheet 10 according to Embodiment 1 in that a third thermally expansive layer 31 is provided between the first thermally expansive layer 12 and the base 11. In other words, in this embodiment, the first thermally expansive layer 12, the second thermally expansive layer 13, and the third thermally expansive layer 31 constitute the thermally expansive layer. The parts having the same structure as in Embodiment 1 are referred to by the same reference numbers and their explanation will be omitted.

Figure 8:
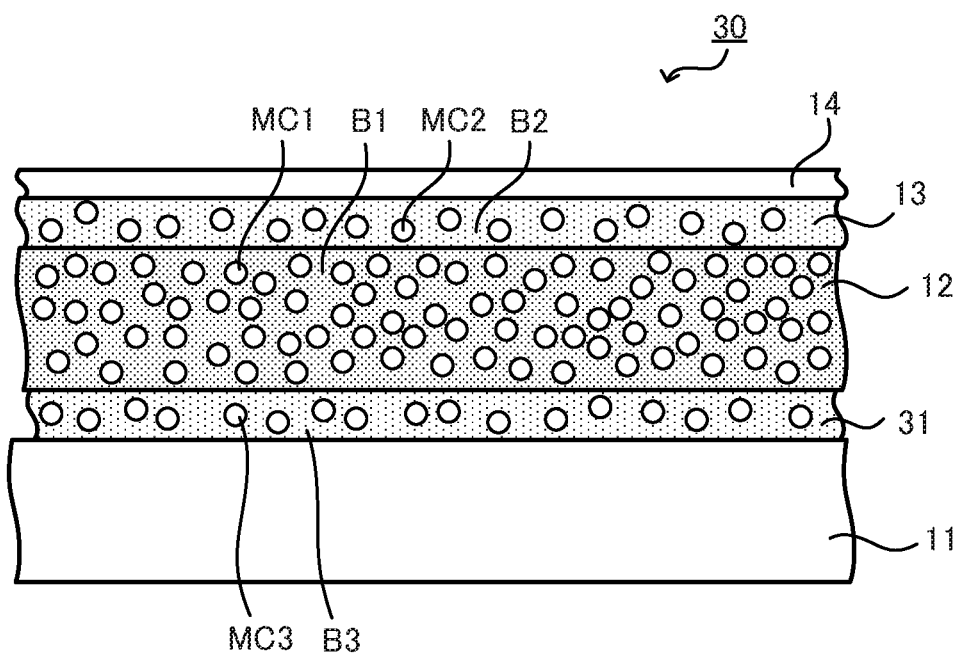
FIG. 8 is a cross-sectional view schematically showing the thermally expandable sheet according to Embodiment 3.

The third thermally expansive layer 31 is formed between the base 11 and the first thermally expansive layer 12 as shown in FIG. 8. Like the first thermally expansive layer 12, the third thermally expansive layer 31 comprises a thermally expandable material MC3 (thermally expandable microcapsules) in a binder B3. Like the first thermally expansive layer 12, absorbing heat generated in the photothermal conversion layer formed on the top surface and/or the underside of the thermally expandable sheet 30, the third thermally expansive layer 31 foams and distends. Moreover, the same materials as the binder and the microcapsules of the first thermally expansive layer 12 and the second thermally expansive layer 13 are used for the binder B3 and the thermally expandable material MC3 of the third thermally expansive layer, respectively.

Moreover, the ratio at which the thermally expandable material MC3 is contained in the binder B3 (the third ratio) in the third thermally expansive layer 31 is lower than the ratio at which the thermally expandable material MC1 is contained in the binder B1 in the first thermally expansive layer 12 (the first ratio). As in Embodiment 1, the ratio at which the thermally expandable material MC3 is contained in the binder B3 is defined by volume ratio, weight ratio, or the like. For example, in the case of using the weight ratio, the weight ratio of the thermally expandable material MC3 to the binder B3 is lower than the weight ratio of the thermally expandable material MC1 to the binder B1 and specifically, is 1/3 to 1/8 or so. In other words, assuming that the thermally expandable material MC3 dispersed in 100 parts by weight of the binder B3 is X3 parts by weight and the thermally expandable material MC1 dispersed in 100 parts by weight of the binder B1 is X1 parts by weight, X3/X1 is less than 1 and 1/3 to 1/8 or so. Here, the ratio at which the thermally expandable material is contained in the binder may be defined by density. In such a case, it can be said that the third thermally expansive layer 31 contains the thermally expandable material at a density lower than the first thermally expansive layer 12.

With the third thermally expansive layer 31 further provided, the thermally expandable sheet 30 of Embodiment 3 can suppress peel-off of the first thermally expansive layer 12 from the base 11 while distending. Here, because of a lower content ratio of the thermally expandable material compared with the first thermally expansive layer 12, it is difficult for the third thermally expansive layer 31 to heighten while distending; therefore, it is preferable to form the third thermally expansive layer 31 thinner than the first thermally expansive layer 12. Moreover, it is preferable that the third thermally expansive layer 31 is formed not thicker than necessary.

The method of producing the thermally expandable sheet 30 according to Embodiment 3 will be described next.

First, the base 11 is prepared. Next, a coating liquid for forming the third thermally expansive layer 31 is prepared. A thermally expandable material is dispersed in a binder using a known dispersion device to prepare a coating liquid for forming the third thermally expansive layer 31. The same materials as the coating liquid for forming the first thermally expansive layer 12 are used for the binder and the thermally expandable material. At this point, the content ratio of the thermally expandable material in the binder of the third thermally expansive layer 31 is lower than the content ratio of thermally expandable material in the binder of the first thermally expansive layer 12. For example, it is 1/3 to 1/8 or so in weight ratio. Subsequently, the coating liquid is applied on the base 11 using a known coating device of a system such as a bar coater, a roll coater, and a spray coater. Subsequently, the coating is dried. The coating liquid may be applied and dried in multiple parts and the third thermally expansive layer 31 of a target thickness is formed on the base 11.

Subsequently, a coating liquid for forming the first thermally expansive layer 12 is prepared as in Embodiment 1. Subsequently, using a known coating device, the coating liquid is applied on the third thermally expansive layer 31 and dried to form the first thermally expansive layer 12. From then on, the second thermally expansive layer 13 and the ink reception layer 14 are formed as in Embodiment 1.

As a result, the thermally expandable sheet 30 according to Embodiment 3 is produced.

Generally, in a thermally expandable sheet, the thermally expansive layer provided on the base is distensible in the direction opposite to the surface on which the base is provided (for example, upward shown in FIG. 8). With this distension, the base and the thermally expansive layer provided immediately above the base may become separated. Conversely, in the thermally expandable sheet 30 of this embodiment, the thermally expansive layer 31 of which the content ratio of the thermally expandable material is lower than the first thermally expansive layer 12 is interposed between the base 11 and the first thermally expansive layer 12. The third thermally expansive layer 31 is suppressed in degree of distension compared with the first thermally expansive layer 12 and therefore, is also suppressed in degree of foaming and distension, whereby it is possible to add an effect of suppressing separation of the thermally expansive layer from the base 11. On the other hand, the third thermally expansive layer 31 itself distends, whereby the third thermally expansive layer 31 also has an effect of contributing to increase in height of the entire thermally expansive layer.

The present disclosure is not confined to the above-described embodiments and various modifications and applications are available. For example, the above-described Embodiment 2 and Embodiment 3 can be combined.

Figure 4:
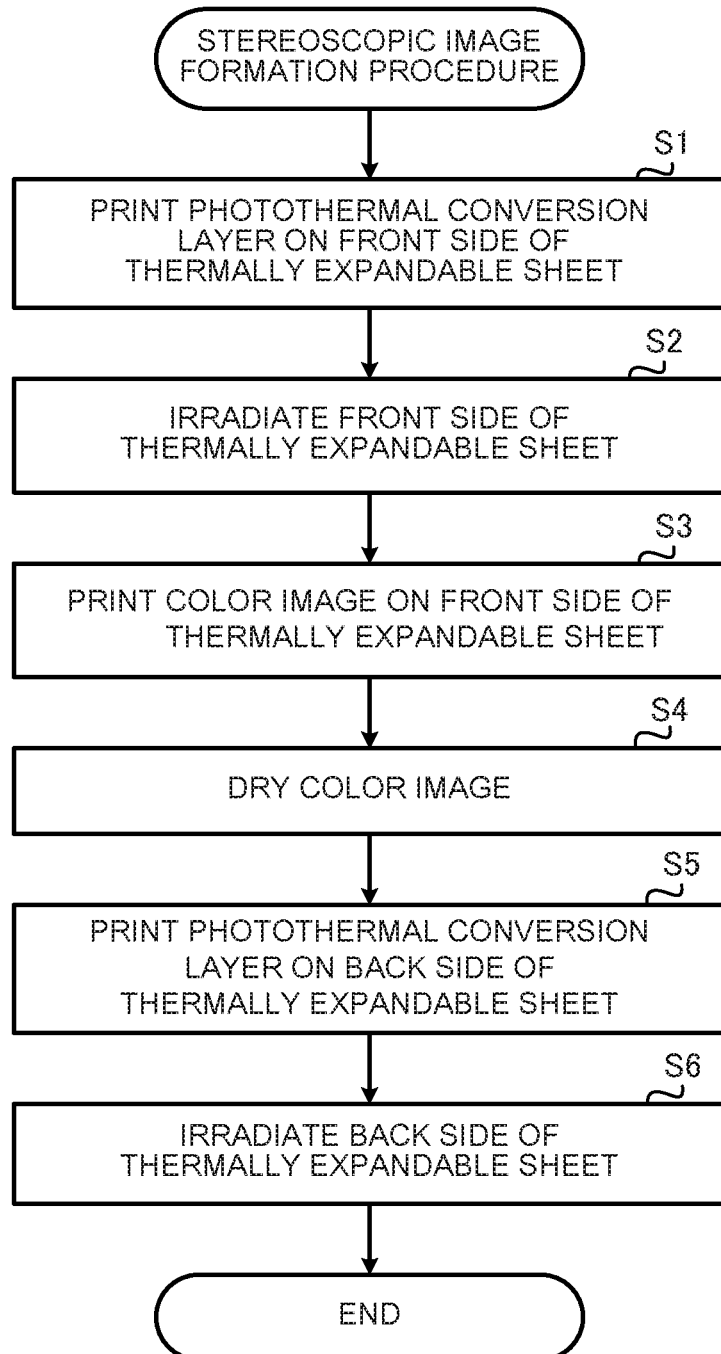
FIG. 4 is a flowchart showing the stereoscopic image formation process according to Embodiment 1.

In the above-described embodiments, explanation is made using an exemplary configuration in which the printing is conducted in the process shown in FIG. 4. However, this is not restrictive. For example, the order of processing can be changed as appropriate. For example, it is possible to form a photothermal conversion layer on both sides of the base, form a color ink layer, and then emit light to each of the front side and the back side of the base to cause the thermally expansive layer to distend.

Moreover, in the above-described embodiments, explanation is made using an exemplary configuration in which the photothermal conversion layer is formed on both the front side and the back side of the base. However, this is not restrictive. The photothermal conversion layer may be formed only on the front side or on the back side depending on the intended use and/or the printing method of the print. Here, when the print is made only on the front side, the ink reception layer has only to be formed at least on the front side.

Moreover, adhesive and release paper may be provided on the back side of the base depending on the intended use of the print, for example in the case of using as a sticker. In such a case, a layer comprising adhesive is formed on the back side of the base and release paper is provided thereon. Here, the ink reception layer may be provided on the release paper.

Embodiments of the present disclosure are described above. The present disclosure is included in the scope of claims and its equivalent scope.

The present disclosure is usable for a thermally expandable sheet foaming and expanding according to the amount of heat absorbed and a method of producing the thermally expandable sheet.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A thermally expandable sheet production method, comprising:
    a first formation step of forming on one side of a base a first thermally expansive layer that contains a first thermally expandable material and a first binder, the first thermally expansive layer having a first ratio of the first thermally expandable material with respect to the first binder; and
    a second formation step of forming on the first thermally expansive layer a second thermally expansive layer that contains a second thermally expandable material and a second binder, the second thermally expansive layer having a second ratio of the second thermally expandable material with respect to the second binder,
    wherein in the second formation step, the second thermally expansive layer is formed on the first thermally expansive layer with the second ratio lower than the first ratio.

2. The thermally expandable sheet production method according to claim 1,
    wherein in the second formation step, the second thermally expansive layer is formed at a thickness that is thinner than a thickness of the first thermally expansive layer.

3. The thermally expandable sheet production method according to claim 2,
    wherein in the second formation step, the second thermally expandable material that is made of the same material as the first thermally expandable material is used to form the second thermally expansive layer on the first thermally expansive layer.

4. The thermally expandable sheet production method according to claim 3,
    wherein the first thermally expandable material and the second thermally expandable material are microcapsules that contain a vaporizing substance in a shell, and
    wherein, in the second formation step, the second thermally expansive layer is formed at a thickness that corresponds to a thickness of several of the microcapsules.

5. The thermally expandable sheet production method according to claim 4, further comprising:
    a third formation step of forming on the base a third thermally expansive layer that contains a third thermally expandable material and a third binder, the third thermally expansive layer having a third ratio of third thermally expandable material with respect to the third binder,
    wherein in the third formation step, the third ratio is lower than the first ratio, and the first thermally expansive layer is formed on the third thermally expansive layer.

6. The thermally expandable sheet production method according to claim 1, further comprising:
    an ink reception layer formation step of forming on the second thermally expansive layer an ink reception layer that receives ink.

7. The thermally expandable sheet production method according to claim 1,
    wherein in the second formation step, the second thermally expandable material that is made of the same material as the first thermally expandable material is used to form the second thermally expansive layer on the first thermally expansive layer.

8. The thermally expandable sheet production method according to claim 1,
    wherein the first thermally expandable material and the second thermally expandable material are microcapsules that contain a vaporizing substance in a shell, and wherein, in the second formation step, the second thermally expansive layer is formed at a thickness that corresponds to a combined thickness of several of the microcapsules.

9. The thermally expandable sheet production method according to claim 1,
wherein in the step of forming the second thermally expansive layer, the second thermally expansive layer further contains white pigment.

10. The thermally expandable sheet production method according to claim 1, further comprising:
a third formation step of forming on the base a third thermally expansive layer that contains a third thermally expandable material and a third binder, the third thermally expansive layer having a third ratio of the third thermally expandable material with respect to the third binder,
wherein in the third formation step, the third ratio is lower than the first ratio, and the first thermally expansive layer is formed on the third thermally expansive layer.

11. The thermally expandable sheet production method according to claim 1,
wherein the first binder of the first thermally expansive layer formed in the first formation step and the second binder of the second thermally expansive layer formed in the second formation step are made of the same material.

12. A shaped object production method comprising:
preparing a medium comprising a thermally expansive layer that is configured to expand with heating; and
applying heat to at least a portion of the medium with a temperature, to cause expansion of the thermally expansive layer and rising of a surface of the medium and to form unevenness on the surface of the medium, the temperature being a temperature that causes the thermally expansive layer to expand, the surface corresponding to the portion of the medium to which the heat is applied,
wherein the thermally expansive layer comprises:
a first thermally expansive layer comprising a first thermally expandable material and a first binder, the first thermally expansive layer having a first ratio of the first thermally expandable material with respect to the first binder, and
a second thermally expansive layer formed on the first thermally expansive layer and comprising a second thermally expandable material and a second binder, the second thermally expansive layer having a second ratio of the second thermally expandable material with respect to the second binder, and wherein the second ratio is lower than the first ratio.

13. The shaped object production method according to claim 12,
wherein a thickness of the second thermally expansive layer is thinner than a thickness of the first thermally expansive layer.

14. The shaped object production method according to claim 12,
wherein an ink reception layer is formed on the second thermally expansive layer prior to the applying and the ink reception layer is configured to receive ink.

15. The shaped object production method according to claim 12,
wherein the first thermally expandable material and the second thermally expandable material are the same material.

16. The shaped object production method according to claim 12,
wherein each of the first thermally expandable material and the second thermally expandable material comprises microcapsules, wherein each of the microcapsules comprises a shell and a vaporizing substance in the shell, and
wherein a thickness of the second thermally expansive layer corresponds to a combined thickness of one to ten times the average particle size of the microcapsules.

17. The shaped object production method according to claim 12,
wherein the second thermally expansive layer further comprises white pigment comprising one of titanium oxide, barium sulfate and zinc oxide.

18. The shaped object production method according to claim 12, further comprising:
prior to the applying, forming at a pattern a conversion layer on the medium comprising the thermally expansive layer, wherein the conversion layer is configured to convert electromagnetic waves to heat,
wherein in the applying, the electromagnetic waves are emitted towards the conversion layer to apply the heat to the portion of the medium with the temperature that causes the thermally expansive layer to expand.

19. The shaped object production method according to claim 18,
wherein in the forming, the conversion layer is formed at a pattern, wherein the pattern is to form a projection having a flat region on top thereof and a recess having a flat region on a bottom thereof upon forming the unevenness in the applying, the unevenness comprising the projection and the recess.

* * * * *